United States Patent [19]

Tamura et al.

[11] Patent Number: 4,522,451
[45] Date of Patent: Jun. 11, 1985

[54] TRACK-TYPE VEHICLE UNDERCARRIAGE

[75] Inventors: Yukio Tamura; Masashi Kaminishi, both of Hiratsuka; Yutaka Kato, Kanagawa, all of Japan

[73] Assignee: Kabushiki Kaisha Komatsu Seisakusho, Tokyo, Japan

[21] Appl. No.: 513,243

[22] Filed: Jul. 13, 1983

[51] Int. Cl.³ ............ B62D 55/10; B62D 55/12; B62D 55/30
[52] U.S. Cl. ............ 305/18; 305/28; 305/31
[58] Field of Search ............ 305/16, 17, 18, 24, 305/25, 27, 28, 31, 32

[56] References Cited

U.S. PATENT DOCUMENTS

| | | | |
|---|---|---|---|
| 1,488,629 | 4/1924 | Wick | 305/18 X |
| 1,520,416 | 12/1924 | Holt | 305/25 X |
| 2,125,531 | 8/1938 | Weeks | 305/31 |
| 3,567,292 | 3/1971 | Amsden | 305/57 |
| 4,402,555 | 9/1983 | Ogaki et al. | 305/25 X |

Primary Examiner—David A. Scherbel
Attorney, Agent, or Firm—Armstrong, Nikaido, Marmelstein & Kubovcik

[57] ABSTRACT

A track-type vehicle undercarriage comprising a track frame, a recoil device mounted on the track frame, a mount member fixedly connected to the recoil device and biased forwardly thereby, an idler rotatably mounted on the mount member, a sprocket, and an endless track of linked together track shoes mounted around the idler and the sprocket. A support member is adjustably mounted on the mount member and a support rail is pivotally mounted at one end thereof on the support member. A separate support device is mounted on the track frame for supporting the other end of the support rail.

3 Claims, 5 Drawing Figures

TRACK-TYPE VEHICLE UNDERCARRIAGE

BACKGROUND OF THE INVENTION

This invention relates to a track-type vehicle undercarriage.

In the conventional undercarriages of the kind specified, upper rails each carrying multi-rollers mounted on an endless track are fixedly secured, respectively, to a bracket fitted to a bearing part of an idler, and therefore as the length of the upper rails becomes longer, a larger moment M is exerted on the supporting part.

In general, as the length of the upper rails becomes longer, the distance between the upper rails becomes shorter. If the sag of the endless track is kept at the same value, the tension on the track will reduce resulting in a reduced running resistance; however, as mentioned above, a larger moment M is exerted on the supporting part.

SUMMARY OF THE INVENTION

It is therefore an object of the present invention to provide an improved track-type vehicle undercarriage which is simple in construction and can reduce wear and noise factors generally associated with such undercarriages.

Another object of the present invention is to provide an improved track-type vehicle undercarriage having a plurality of track rollers mounted on an endless track of linked together track shoes wherein a smooth travel of the endless track and reduction of striking noise are effected.

In accordance with an aspect of the present invention, there is provided a track-type vehicle undercarriage, comprising: a track frame; recoil means mounted on said track frame, said recoil means having a piston slidably mounted therein and means for biasing said piston forwardly; mount means fixedly connected to said piston, said mount means being adapted to be slidable in the longitudinal direction of the vehicle relative to said track frame; an idler rotatably mounted on said mount means; a sprocket; an endless track of linked together track shoes mounted around said idler and said sprocket, said endless track having a plurality of rollers mounted thereon; a support member mounted on said mount means; a bracket mounted on said track frame with a longitudinally spaced apart relation from said mount means; roller means mounted for rotation on said bracket; and a support rail pivotally mounted at one end thereof to said support member, the other end of said support rail being supported by said roller means, said support rail having a flat top surface and a downwardly inclined top surface formed thereon to permit a smooth travel of said endless track.

The above and other objects, features and advantages of the present invention will be readily apparent from the following description taken in conjunction with the accompanying drawings.

DESCRIPTION OF THE PREFERRED EMBODIMENTS

The present invention will now be described below by way of example only with reference to the accompanying drawings.

Figure 1:
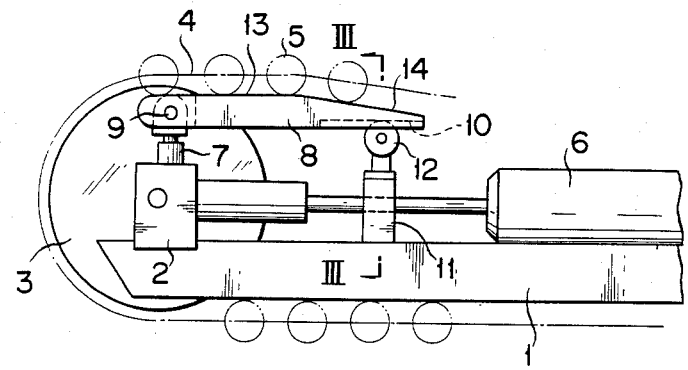
FIG. 1 is a fragmentary side elevational view, partly broken away for clarity, of a track-type vehicle undercarriage according to the present invention.
Figure 2:
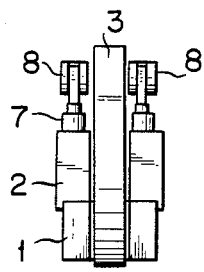
FIG. 2 is a front elevation view of the undercarriage of FIG. 1.
Figure 3:
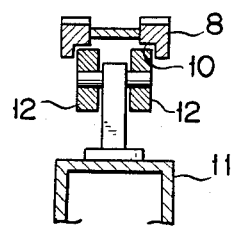
FIG. 3 is a sectional view taken along the line III—III of FIG. 1.

Referring to FIGS. 1 to 3, reference numeral 1 denotes track frames each having a bearing block 2 which is movably mounted thereto in the fore and aft direction of the vehicle. An idler 3 is rotatably supported by the bearing block 2.

An endless track 4 extends around the idler 3 and a sprocket (not shown) fitted to the rear part of the track frame 1 and is provided with a plurality of rollers 5.

Mounted on the track frame 1 is a recoiler 6 adapted to urge the idler 3 forwardly to give a tension to the endless track.

Fixedly secured to each of the bearing blocks 2 is a vertically adjustable support 7 to which the base portion of a support rail 8 is fitted by a pin member 9 so that it may be oscillated vertically. The lower surface of the rear end section of each support rail 8 has a guide groove 10 formed therein and which extends along the axis of the rail 8.

Fixedly secured to the upper surface of the track frame 1 is a bracket 11 which rotatably supports rollers 12. The rollers 12 are kept in contact with the guide grooves 10 of the support rail 8 so as to support the latter generally horizontally. The support rail 8 carries the rollers 5 of the endless track 4.

Thus, the support rail 8 is arranged to be supported at two points by the support 7 and a support arrangement comprised of the bracket 11 and the rollers 12, and so the moment exerted on the support portions is reduced as compared with a conventional cantilever supported rail.

Further, when the support rail 8 is worn away, the support 7 can be adjusted vertically to maintain the rail 8 at an optimum height.

The upper surface of the support rail 8 with which the rollers 5 are kept in rolling contact comprises a horizontal section 13 and a rear inclined section 14 which permit smooth rolling of the rollers 5 on the support rail 8.

Figure 4:
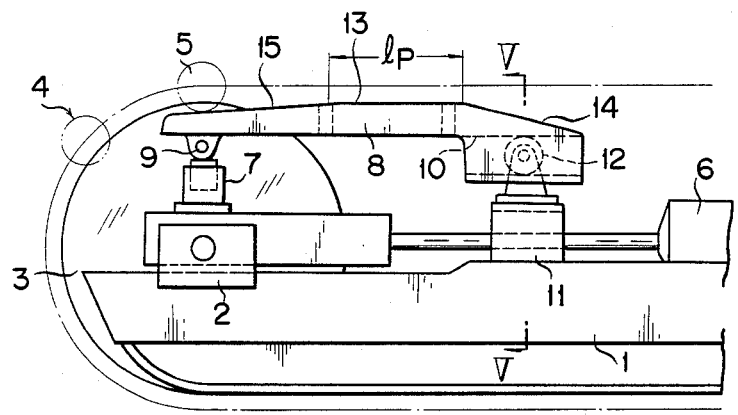
FIG. 4 is similar to FIG. 1 but showing another embodiment of the invention.
Figure 5:
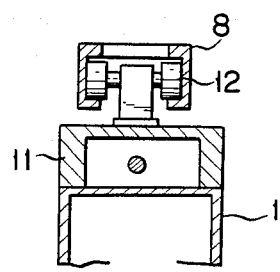
FIG. 5 is a sectional view taken along the line V—V of FIG. 4.

With reference to FIGS. 4 and 5, there is shown another embodiment of the present invention in which a support rail 8' having a different shape of upper surface is provided and permit smooth rolling of the rollers on the support rail 8'. Stating more specifically, the upper surface of the support rail 8' is formed by a horizontal section 13, an inclined section 14 and an additional inclined section 15 formed on the side of the idler so as to allow the rollers to ride thereon smoothly. The length of the horizontal section 13 is at least equal to link pitch lp. The rollers 5 of the endless track 4 are arranged to ride, first, on the inclined section 15 and roll on the horizontal section 13 and then reach the inclined section 14 when advancing rearwardly. In this case, because the length of the horizontal section 13 is equal to the link pitch lp of the endless track 4, it is possible to prevent effectively the idle play of the endless track 4.

Another arrangement of the second embodiment is generally similar to the arrangement of the aforementioned first embodiment.

Since the present invention is constructed as mentioned in detail hereinabove, the support rail 8 is supported at two points so that the moment exerted on the supporting portion can be reduced as compared with a conventional cantilever supported rail.

Further, the position of the rail 8 can be adjusted vertically by means of the support 7, and therefore even if the support rail 8 is worn out they can be maintained at a proper height.

Furthermore, in the second embodiment of the present invention, because the horizontal or rectilinear section 13 having a length which is at least equal to the link pitch lp is provided on the tread surface of the rail 8, it is possible to prevent the occurrence of idle plays of the endless track 4.

It is to be understood that the foregoing description is merely illustrative of preferred embodiments of the invention and that the invention is not to be limited thereto, but is to be be determined by the appended claims.

What is claimed is:

1. A track-type vehicle under carriage, comprising:
   a track frame;
   recoil means mounted on said track frame, said recoil means having a piston slidably mounted therein and means for biasing said piston forwardly;
   mount means fixedly connected to said piston, said mount means being adapted to be slidable in the longitudinal direction of the vehicle relative to said track frame;
   an idler rotatably mounted on said mount means;
   a sprocket;
   an endless track of linked together track shoes mounted around said idler and said sprocket, said endless track having a plurality of rollers mounted thereon;
   a support member mounted on said mount means;
   a bracket mounted on said track frame with a longitudinally spaced apart relation from said mount means;
   roller means mounted for rotation on said bracket; and
   a support rail pivotally mounted at one end thereof to said support member, the other end of said support rail being supported by said roller means, said support rail having a flat top surface and a downwardly inclined top surface formed thereon to permit a smooth travel of said endless track.

2. A track-type vehicle undercarriage according to claim 1 wherein said support member is vertically adjustable relative to said mount means.

3. A track-type vehicle undercarriage according to claim 2 wherein said support rail has another downwardly inclined top surface formed thereon at the side of said idler and wherein length of the flat top surface is equal to or greater than the link pitch of said endless track.

* * * * *